Jan. 27, 1925.
J. W. BRONSON
1,524,535
LISTER ATTACHMENT FOR PLOWS OR CULTIVATORS
Filed May 12, 1922
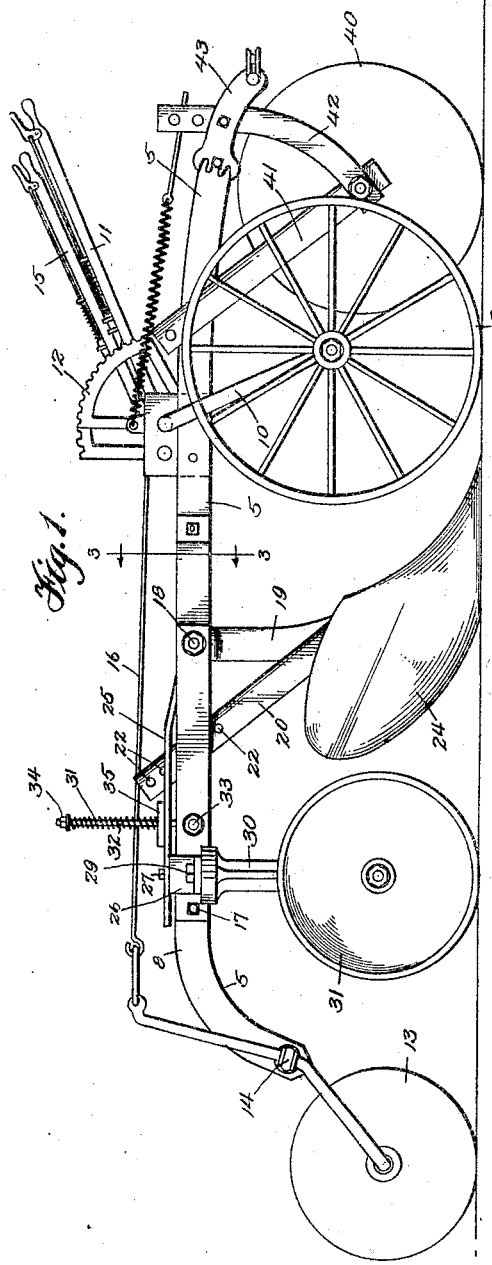
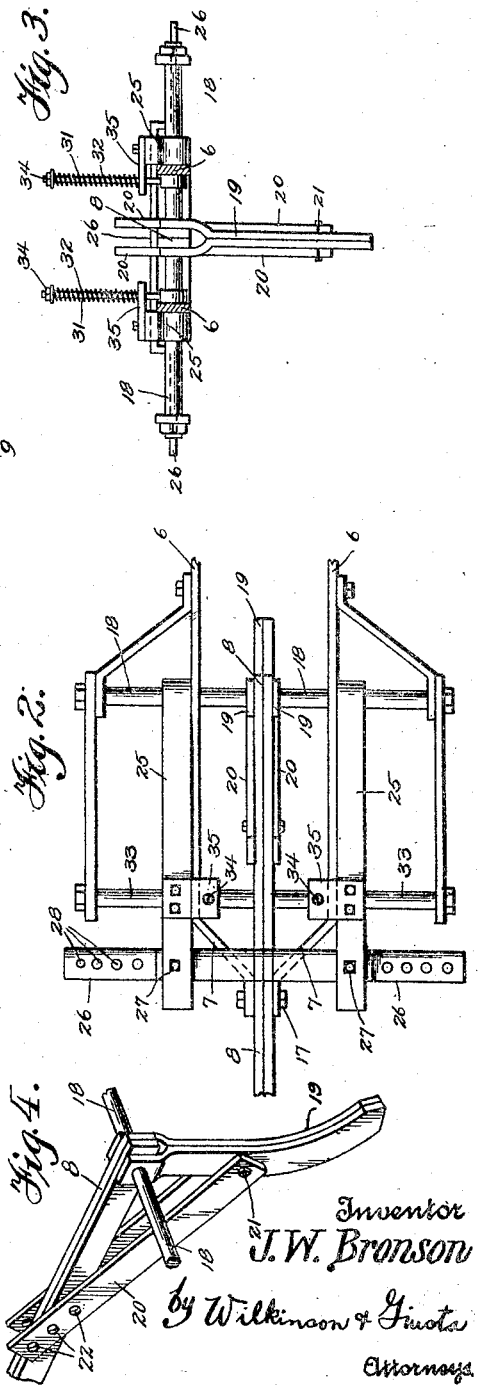
Inventor
J. W. Bronson
by Wilkinson & Guiota
Attorneys Patented Jan. 27, 1925.

1,524,535

UNITED STATES PATENT OFFICE.

JOHN WILEY BRONSON, OF NEW ORLEANS, LOUISIANA.

LISTER ATTACHMENT FOR PLOWS OR CULTIVATORS.

Application filed May 12, 1922. Serial No. 560,415.

*To all whom it may concern:*

Be it known that I, JOHN WILEY BRONSON, a citizen of the United States, residing at New Orleans, in the parish of Orleans and State of Louisiana, have invented certain new and useful Improvements in Lister Attachments for Plows or Cultivators; and I do hereby declare the following to be a full, clear, and exact description of the invention, such as will enable others skilled in the art to which it appertains to make and use the same.

The present invention relates to farm implements and more especially to a combination lister and disk gang attachment for powerlift cane cultivators, and has for one of its objects to provide an apparatus of this character which will be simple in construction, comparatively inexpensive to manufacture, and more efficient in use than those which have been heretofore proposed.

In using tractor-driven listers for capping off a row, the usual result is the turning to one side or the other of heavy masses of stubble, clods, and the like, and when it is desired to return over this row for a further operation, the obstacles just mentioned make it impossible to properly and efficiently drive the tractor, thereby seriously interfering with the use of motor power for this purpose.

It is therefore a primary object of this invention to provide a lister so placed and arranged in conjunction with one or more gangs of disks that the stubble and clods which are turned up by the said lister will be directly in the path of the said disks, whereby the latter may almost immediately engage the said clods to break up the same. This being accomplished it is a comparatively easy matter to return over the same row with a tractor for further operations.

Owing to the peculiar construction of the device, it is possible to substitute a double mold board or sweep for the lister bottom and without changing any of the other parts the apparatus may then be used for cultivating as a disk cultivator. The sweep or mold board being in front of the disk gangs it ploughs up the soil in the middle, throwing it to either side in front of the said gangs, which pulverize it and carry it to the row, thereby putting the soil in a better condition for the use of the plants.

The present invention is especially adapted for use in connection with the powerlift cane cultivator described and claimed in my prior co-pending application, filed June 21, 1921, Serial No. 479,334, patented Aug. 1, 1922, as Patent Number 1,424,552 although it is obvious that it may be employed in connection with various other types of similar apparatus.

Referring to the accompanying drawings forming a part of this specification in which like numerals designate like parts in all the views;

Figure 1 is a side elevational view of one form of apparatus made in accordance with the present invention;

Fig. 2 is a fragmentary plan view of a portion of the parts shown in Fig. 1, illustrating in detail the supporting members of the lister bottom;

Fig. 3 is a partial transverse sectional view, taken approximately on the line 3—3 of Fig. 1, looking in the direction of the arrows; and Fig. 4 is a detail perspective view of the lister supporting members.

Referring more especially to Figs. 1 and 2, the numeral 5 indicates a frame comprising the spaced longitudinally extending members 6, the rear ends of which are bent inwardly as at 7, and are secured to the relatively short centrally located beam 8.

The said frame 5 is supported by means of the front wheels 9 journalled upon the bent axle 10, which is pivotally connected to the frame 5 in the usual and well known manner, whereby the said frame may be raised and lowered with respect to the ground by moving the handle 11 about its sector 12 in the customary manner. The rear end of the frame is preferably supported upon the rear wheel 13 which may be also adjusted about its pivot 14 by means of the lever 15 and link connection 16, to raise and lower the frame 5 with respect to the surface of the ground.

As above mentioned, the short central beam 8 is secured to the inturned ends 7 of the spaced longitudinal frame members 6 as by the bolt 17, and it extends a short distance forwardly as will be clear from Fig. 2. A transverse bar or rod 18 extends through the side member 6 and also through the inner end of the center beam 8, thereby supporting the same. Pivotally mounted upon this said transverse rod 18, adjacent the center beam 8, is the substantially vertically disposed lister supporting member 19, the lower portion of which is preferably curved, substantially as shown, and the upper portion being bifurcated to straddle the said center beam 8.

A pair of angularly disposed bracing members 20 is pivotally secured to the said lister supporting member 19, as at 21, and their upper ends are provided with a plurality of holes or perforations 22, which are adapted to register with a perforation in the center beam 8, whereby a bolt or pin may be passed therethrough to secure the lister supporting member in any desired position. It will be readily apparent that by causing different perforations 22 to register with the perforation in the center beam 8 that the position of the member 19, and consequently of the lister bottom 24 which is secured thereto in any suitable and well known manner, may be varied to suit different conditions.

Pivotally carried by the cross bar 18, adjacent the said frame member 6, is a pair of horizontally extending members 25, the rear ends of which are connected together by means of the cross member 26, and secured thereto by suitable bolts or other fastenings 27. The member 26 extends laterally somewhat beyond the members 25 and its extended ends are provided with a plurality of perforations 28, which are adapted to receive the pivot bolts or studs 29 of the disk gang frames or supporting members 30, which frames carry the plurality or gang of disks 31, as will be clear from Fig. 1.

It will thus be seen that the disk gangs are non-rigidly carried by the frame 5, in that they are permitted to pivot about the cross bar 18, whereby a certain amount of substantially vertical movement thereof may be permitted. This vertical movement may be controlled by means of the spiral springs 31, which surround the vertically extending bolts or rods 32. The bolts are pivoted to the frame 5 at 33 and carry at their upper ends the nuts 34. The said springs 31 are confined between the said nuts 34 and the ears or transversely extending plates 35, which are rigidly secured to the longitudinally extending members or arms 25 all as will be clear from Figs. 1 and 2.

It will thus be seen that the lister bottom 24 is adjustably mounted just to the rear of the front wheels of the cultivator and in such a position that it will throw the clods, stubble, and the like, directly into the path of the disk gangs, which are mounted directly behind the said lister. It thus results that these clods and stubble are almost immediately acted upon by the disks with the result that they are broken and cut up to such an extent that when the tractor returns over the row, no difficulty is experienced in its operation and manipulation.

If desired, a relatively large rolling colter 40 may be adjustably mounted in the front end of the frame 5 by means of the adjustable arms or beams 41 and 42, for the purpose of cutting vines or other plants which may be present in the ground, prior to the operation of the lister thereon, thereby preventing the clogging of the apparatus. A suitable clevis 43 is provided at the front end of the frame 5, whereby the machine may be attached or coupled to a tractor.

It will thus be seen that this invention provides a combination lister and disk gang cultivator in which the lister first acts to turn over the sod, stubble, clods, and the like, which material is deposited immediately in front of the advancing disk gangs, which serve to efficiently break up the clods so that a tractor or other motor driven device may be driven thereover without inconvenience.

It is obvious that those skilled in the art may vary the details of construction, as well as the arrangement of parts without departing from the spirit of the invention, and therefore I do not wish to be limited to the above disclosure except as may be required by the claims.

What I claim is:

1. In a device of the class described the combination with a frame having front and rear wheels, of a lister bottom adjustably mounted on said frame intermediate said wheels; a transverse rod carried by said frame; longitudinally extending members pivotally mounted on said rod; a cross bar connecting said longitudinal members; a gang of discs vertically pivoted to said cross bar; and means for yieldingly resisting upward movements of said longitudinal members and discs.

2. In a device of the class described the combination with a frame having front and rear wheels, of a lister bottom adjustably mounted on said frame intermediate said wheels; a transverse rod carried by said frame; longitudinally extending members pivotally mounted on said rod; a cross bar connecting said longitudinal members; a gang of discs vertically pivoted to said cross bar; and yieldable connections between said frame and longitudinal members for resisting upward movement of the latter.

3. In a device of the class described the combination with a frame having front and rear wheels, of a lister bottom adjustably mounted on said frame intermediate said wheels; a transverse rod carried by said frame; longitudinally extending members pivotally mounted on said rod; a cross bar connecting said longitudinal members; a gang of discs vertically pivoted to said cross bar; a plurality of vertically extending bolts, the lower ends of which are pivotally secured to said frame adjacent said longitudinal members; nuts adjustably carried by the upper ends of said bolts; and springs interposed between said nuts and longitudinal members, for yieldingly resisting upward movements of the latter.

4. In a device of the class described the combination with a frame having front and rear wheels, of a lister bottom adjustably mounted on said frame intermediate said wheels; a transverse rod carried by said frame; longitudinally extending members pivotally mounted on said rod; a cross bar connecting said longitudinal members; a gang of discs vertically pivoted to said cross bar; laterally extending ears carried by said longitudinal members; a plurality of vertically extending bolts passing through said ears, the lower ends of said bolts being pivotally secured to said frame; nuts adjustably carried by the upper ends of said bolts; and springs interposed between said nuts and ears, for yieldingly resisting upward movements of said longitudinal members.

JOHN WILEY BRONSON.